Patented Mar. 10, 1942

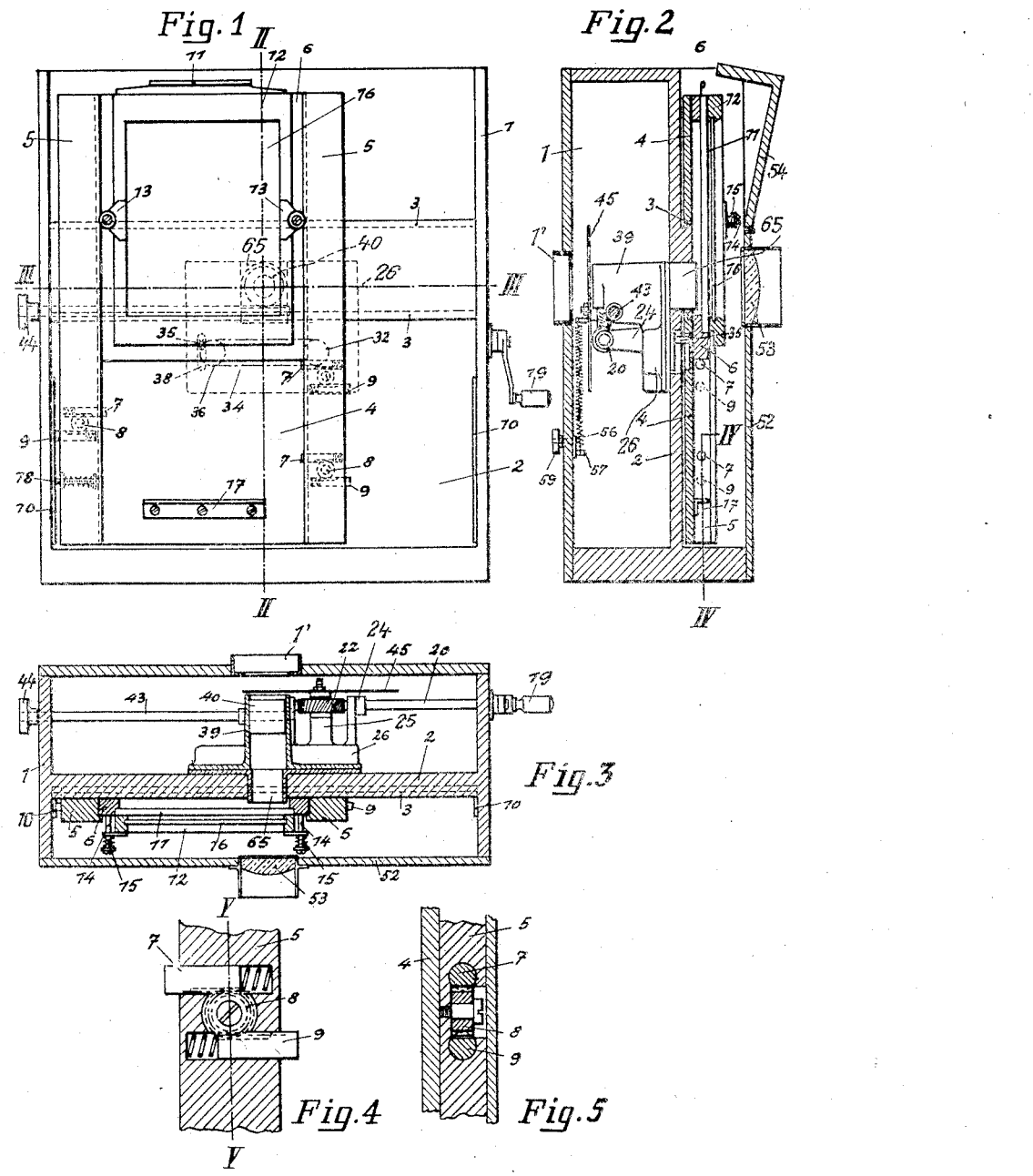

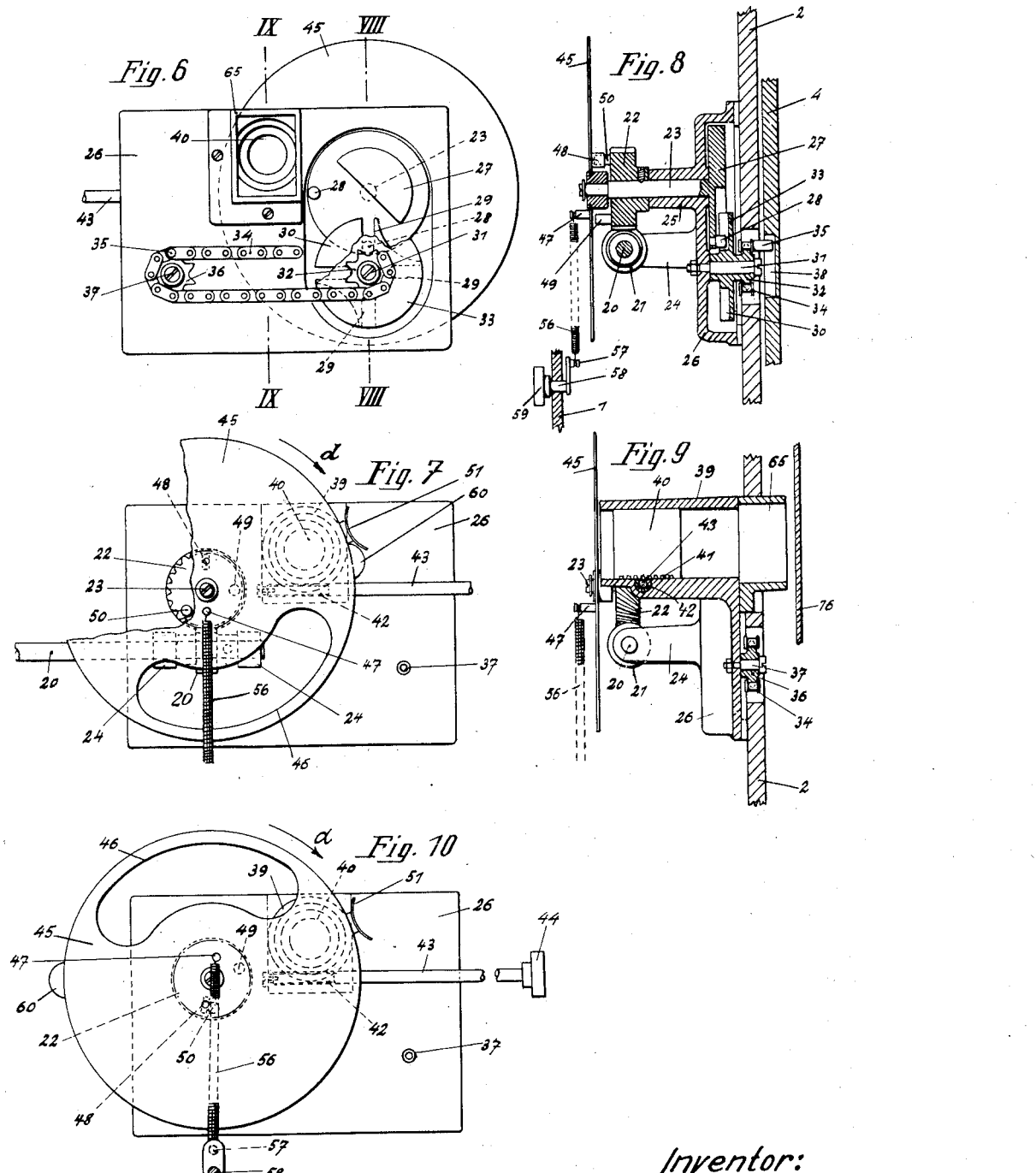

2,275,519

UNITED STATES PATENT OFFICE 2,275,519

CAMERA FOR TAKING A PLURALITY OF PHOTOGRAPHS ON ONE PLATE

Hans Friederichs, Berlin, Germany

Application February 21, 1939, Serial No. 257,733
In Germany February 22, 1938

7 Claims. (Cl. 88—16)

My invention relates to a camera for taking a plurality of photographs on one plate.

In a camera of this kind, I provide a case, an objective in the case, and a carrier for a dark slide which is mounted to reciprocate horizontally and vertically in the case. A manual member is provided for moving the carrier horizontally.

Cameras of this kind are known in which the carrier is operated by a link chain which moves to and fro horizontally and is equipped with a pin engaging in a slot of the carrier which is moved horizontally by these means.

It is an object of my invention to provide an improved camera of the kind aforesaid.

To this end, a manual member, or crank, for driving the carrier is operatively connected to a slot wheel and pin gear which, in turn, is operatively connected to the carrier.

Providing the said gear has the advantage that the carrier, when stationary, is held against movement in both directions, and unintentional shifting of the frame is avoided.

In a camera equipped with a link chain and pin, as described, the slot wheel and pin gear has the additional advantage that the sprocket of the link chain is turned through an angle of 180 degs. for each operation, so that the horizontal movement of the carrier occurs on the straight portion of the link chain and the circular movement of the pin about the sprocket only serves for the vertical movement of the carrier.

In the drawings, a camera embodying my invention is illustrated diagrammatically by way of example.

In the drawings

Fig. 1 is an elevation of the camera, viewed from the rear, with the rear cover removed.

Fig. 2 is a section on the line II—II in Fig. 1.

Fig. 3 is a section on the line III—III in Fig. 1.

Fig. 4 is a section on the line IV—IV in Fig. 2, drawn to a larger scale.

Fig. 5 is a section on the line V—V in Fig. 4.

Fig. 6 is an elevation of the frame in which the mechanism of the slot wheel and pin gear is housed, viewed from the rear.

Fig. 7 is an elevation of the frame, viewed from the front, showing the shutter—partly broken away—in the position in which the shutter has concealed the objective.

Fig. 8 is a section on the line VIII—VIII in Fig. 6.

Fig. 9 is a section on the line IX—IX in Fig. 6.

Fig. 10 is an elevation of the frame which is similar to Fig. 7 but shows the shutter about to expose the objective.

Referring now to the drawings, and first to Figs. 1, 2, and 3, the case 1 of the camera is subdivided into a front and a rear compartment by an opaque partition 2. The front compartment is closed by a front cover in which is an aperture 1' in line with the objective 40. The objective 40 is mounted to slide in a tubular extension 39 at the front side of a frame 26 which is attached to the front side of the opaque partition 2. A picture frame 65, in the shape of a rectangular box, as best seen in Fig. 6, projects from the rear of the frame 26 and through the opaque partition 2. At the rear, the case 1 is closed by the rear cover 52 in which is inserted a magnifying lens 53 for inspecting the comparatively small pictures the objective 40 projects on a ground-glass screen 16, Fig. 3.

A pair of parallel horizontal guiding strips 3 are formed by undercuts on a rib which projects from the rear face of the partition 2. On this rib, and flush with it, is mounted to slide a carrier 4, with corresponding undercuts. The carrier 4 is a vertical member of U-section, with a pair of ribs 5 at its sides. A dark-slide frame 6 is mounted to slide vertically between the ribs 5, and is alternately supported by three spring-controlled pins 7 arranged at various levels in the ribs 5. The pins are made with racks, Figs. 4 and 5, and each pin is connected to a spring buffer 9 which is also made with a rack, by a pinion 8. The spring buffers 9 project beyond the outer sides of the ribs 5 in which they are mounted, and when the carrier 4 is in one of its final positions, the spring buffers 9 bear against abutments 10 at the inner sides of the frame 1 and are arrested while the carrier still moves. The relative movement of the spring buffers and the carrier 4 is transmitted to the corresponding pins 7 in opposite direction. The corresponding pin 7 is now withdrawn and the dark-slide frame 6 is allowed to descend by gravity until arrested by the next lower pin 7.

At its rear side, the dark slide 11 is held by a frame 12 having eyes 13 sliding on pins 14 in the dark-slide frame 6 and forced inwardly by springs 15 on the pins 14. The frame 12 also holds the ground-glass screen 16. When it is desired to focus the picture, that is, when there is no dark slide 11 in the frame 12, the springs 15 force the frame 12 into the recess provided for the dark slide 11 in the frame 6, and the ground-glass screen 16 is placed in the same position as the sensitized layer in the dark slide.

In its lowermost position, the dark-slide frame 6 is arrested by an angular member 17 on the carrier 4. In order to prevent unintentional further turning of the crank after the last picture has been taken, a locking pin 18 is mounted to slide in the rib 5 at the left which is controlled by a spring. While the dark-slide frame descends and is arrested by the pins 7, as described, which are pitched for the height of a picture, the inner end of the locking pin 18 is free to project from the inner side of the left-hand rib 5 as often as its outer end abuts against the abutment 10 but when the dark-slide frame 6 is on the angular member 17, the locking pin 18 is held against inward movement and prevents further shifting of the carrier 4.

The carrier 4, with the dark slide frame 6 which descends by gravity under the control of the pins 7, is reciprocated horizontally from a manual member, or crank 19, by the mechanism which will now be described.

The shaft 20 of the crank 19 is mounted in bearings 24 on the frame 26, as best seen in Figs. 7, 8, and 9, and a worm 21 is keyed on it between the bearings 24. This meshes with a worm wheel 22 on a shaft 23, Fig. 8, which is mounted to rotate in a tubular bearing 25 on the frame 26. A pin wheel 27, with two pins 28, is mounted on the rear end of the shaft 23. The pins 28 are arranged to engage in slots 29 in a slot wheel, or Maltese gear, 30 which is mounted to rotate on a shaft 31 in the frame 26. Every time, a pin 28 engages in a slot 29, the slot wheel 30 is turned through an angle of 90 degs.

A disk 33, with a sprocket 32, is formed on the slot wheel 30. A link chain 34, with a dog pin 35, is supported by the sprocket 32 and an idle sprocket 36, Fig. 6, on a shaft 37 secured to the frame 26. The dog pin 35 on the chain 34 engages in a vertical groove 38 in the carrier 4 so that the carrier is reciprocated horizontally by the chain.

The objective 40 in the tube 39, Fig. 9, is made with a rack 41 in which engages a pinion 42 on a focussing shaft 43. The shaft is rotated by a knurled handle 44.

A rotary shutter 45, with a slot 46 therein, is mounted to rotate freely on the shaft 23 of the worm gear 22, Figs. 7 and 8. A pin 47 is arranged eccentrically on the shutter 45 to which the upper end of a shutter spring 56 is attached. Its lower end is attached to the pin 57 of a crank on a shaft 58 which is mounted to rotate in the front wall of the case 1, and is operated by a handle 59. By these means, the tension of the spring 56 and the velocity it imparts to the shutter 45, can be regulated. The shutter 45 is controlled by the worm wheel 22 through pins 49 and 50 engaging a check 48 on the shutter 45. However, the velocity of the shutter is independent of the velocity at which the worm wheel 22 is rotated.

Fig. 7 shows the initial position of the shutter 45, just after an exposure has been made. The spring 56 is under minimum tension. The worm gear 22 rotates in the direction of the arrow d until its pin 50 engages the check 48 on the shutter 45 and turns the shutter in the direction d. Fig. 10 shows the position in which the spring pin 47 is at its upper dead center and the tension of the spring 56 is a maximum. When upon further movement of the pin 50 the dead center position is overstepped, the spring throws over the shutter and its slot 46 moves past the objective 40 at a velocity which is a function of its spring tension, and is independent of the velocity of the worm gear 22. While the shutter 45 moves from its initial position, Fig. 7, into the dead-center position of the pin 47, Fig. 10, the pins 28 on the pin wheel 27, cooperating with the slot wheel 30, feed the carrier 4 through the sprocket 32, the chain 34, and its dog 35. When the spring pin 47 is in its dead-center position, the carrier 4 is stationary, and a picture is now exposed, as described. It will be understood that after the dead-center position has been overstepped the shutter 45 no longer partakes in the rotation of the worm wheel 22, and the spring 56 performs the exposure independently and for a uniform period. A cam 60 on the shutter moves past a spring catch 61 and, when the spring 56 has its minimum tension, engages below the catch, as shown in Fig. 7.

The pin 49 on the worm gear 22 serves for opening the shutter 45 for focussing on the ground-glass plate 16, by turning the worm wheel 22 against the arrow d.

I claim:

1. In a camera of the kind described, a case, an objective on the case, a carrier for a sensitized layer mounted to reciprocate horizontally in the case, a manual member, mechanism including a slot wheel and pin gear operatively connecting the manual member and the carrier, a slotted shutter mounted to rotate freely with respect to the mechanism, a spring attached to the shutter at a point positioned eccentrically with respect to its axis, and means operatively connected to the mechanism for turning the shutter until the spring oversteps its tensional dead-center position, said means being so arranged with respect to the shutter that it can move independently of the means after the dead-center position has been overstepped.

2. In a camera of the kind described, a case, an objective on the case, a carrier for a sensitized layer mounted to reciprocate horizontally in the case, a manual member, mechanism including a slot wheel and pin gear operatively connecting the manual member and the carrier, a slotted shutter mounted to rotate freely with respect to the mechanism, a cam on the shutter, a spring catch for cooperation with the cam, a spring attached to the shutter at a point positioned eccentrically with respect to its axis, and means operatively connected to the mechanism for turning the shutter until the spring oversteps its tensional dead-center position, said means being so arranged with respect to the shutter that it can move independently of the means after the dead-center position has been overstepped.

3. In a camera of the kind described, a case, an objective on the case, a carrier for a sensitized layer mounted to reciprocate horizontally in the case, a manual member, mechanism including a slot wheel and pin gear operatively connecting the manual member and the carrier, a slotted shutter mounted to rotate freely with respect to the mechanism, a spring attached to the shutter with one end at a point positioned eccentrically with respect to its axis, means for displacing the other end of the spring for regulating its tension, and means operatively connected to the mechanism for turning the shutter until the spring oversteps its tensional dead-center position, said means being so arranged with respect to the shutter that it can move independently of the means after the dead-center position has been overstepped.

4. In a camera of the kind described, a case, an objective on the case, a carrier for a sensitized layer mounted to reciprocate horizontally in the case, a manual member, mechanism including a slot wheel and pin gear operatively connected to the manual member and the carrier, a slotted shutter mounted to rotate freely with respect to the mechanism, a spring attached to the shutter with one end at a point positioned eccentrically with respect to its axis, a shaft mounted to rotate on the case, manual means for turning the shaft, a crank on the shaft, a pin on the crank to which the other end of the spring is attached, and means operatively connected to the mechanism for turning the shutter until the spring oversteps its tensional dead-center position, said means being so arranged with respect to the shutter that it can move independently of the means after the dead-center position has been overstepped.

5. In a camera, a case, a carrier mounted for horizontal reciprocation in said case, a gravity operated dark slide frame vertically movable in said carrier, and means for controlling the step-by-step downward movement of said frame, said controlling means including slidable members arranged in pairs at opposite sides of the carrier, one of the slidable members of each pair forming a stop for the frame and the other sliding member being engageable with the case at the opposite limits of movement of the carrier, and means for imparting the sliding motion of one member to the other.

6. In a camera, a case, a carrier mounted for horizontal reciprocation in said case, a gravity operated dark slide frame vertically movable in said carrier, and means for controlling the step-by-step downward movement of said frame, said controlling means including slidable members arranged in pairs at opposite sides of the carrier, one of the slidable members of each pair forming a stop for the frame and the other sliding member being engageable with the case at the opposite limits of movement of the carrier, and means for imparting the sliding motion of one member to the other, and a member movably mounted in the carrier and obstructed in the lowermost position of the frame to prevent operation of the camera.

7. In a camera, a case, an objective in the case, a carrier for sensitized material mounted to reciprocate horizontally in the case, a manually operable member, a transmission mechanism operable by said member, a slot wheel, a pin wheel operable by said mechanism and having pins arranged to engage two in succession with the slots of the slot wheel at each operation of the manual member to turn the slot wheel through an angle of 180°, a link chain operable by one of said wheels, and a pin on said chain permanently engaging the carrier, a rotatable shutter, a release spring associated with said shutter and means for varying the tension of said spring.

HANS FRIEDERICHS.